US010429253B2

(12) United States Patent
Carkner

(10) Patent No.: US 10,429,253 B2
(45) Date of Patent: Oct. 1, 2019

(54) ARMOR PLATE DAMAGE DETECTION SYSTEM

(71) Applicant: Revision Military S.a.r.L., Luxembourg (LU)

(72) Inventor: Steve Carkner, Ottawa (CA)

(73) Assignee: Revision Military Ltd., Essex, VT (US)

( * ) Notice: Subject to any disclaimer, the term of this patent is extended or adjusted under 35 U.S.C. 154(b) by 0 days.

(21) Appl. No.: 15/379,386

(22) Filed: Dec. 14, 2016

(65) Prior Publication Data

US 2017/0167927 A1    Jun. 15, 2017

Related U.S. Application Data

(60) Provisional application No. 62/266,898, filed on Dec. 14, 2015.

(51) Int. Cl.
*G01L 1/16* (2006.01)
*F41H 5/00* (2006.01)

(52) U.S. Cl.
CPC . *G01L 1/16* (2013.01); *F41H 5/00* (2013.01)

(58) Field of Classification Search
CPC ........................................................ G01L 1/16
See application file for complete search history.

(56) References Cited

U.S. PATENT DOCUMENTS 6,332,390 B1 * 12/2001 Lyons ................... F41H 5/0435
2/2.5
7,180,302 B2 * 2/2007 Kelsey ................... F41H 5/0414
324/525

7,921,757 B1 * 4/2011 Vavrick ..................... F41H 1/02
2/2.5
8,087,339 B2 * 1/2012 Mann ..................... A61K 39/00
89/36.02
8,333,140 B2 * 12/2012 Meitzler ................. F41H 5/007
109/21

(Continued)

FOREIGN PATENT DOCUMENTS

GB    WO 2006103400 A1 * 10/2006 ........... F41H 5/0414
JP           2008196926 A  *  8/2008
(Continued)

OTHER PUBLICATIONS

International Search Report and Written Opinion for International Application No. PCT/IB2016/001881, dated May 8, 2017, 14 pages.

(Continued)

*Primary Examiner* — Jamel E Williams

(74) *Attorney, Agent, or Firm* — Wolf, Greenfield & Sacks, P.C.

(57) ABSTRACT

An armor plate damage detection and testing system is disclosed that uses an initial electrical signal to generate mechanical energy waves that travel across the armor plate and reflect off the plate surfaces, wherein the reflections of those waves are recorded and analyzed with reference to a previously stored wave reflection signature to determine if damage has occurred to the armor plate. The analyzed results are communicated to the user in real time using a display unit and can further be communicated to a remote entity through an incorporated wireless transmitter.

17 Claims, 9 Drawing Sheets

(56) References Cited

U.S. PATENT DOCUMENTS

| | | | |
|---|---|---|---|
| 8,352,201 B2 | 1/2013 | Qing et al. | |
| 8,752,432 B2* | 6/2014 | Meitzler | G01N 29/11 73/582 |
| 2002/0075189 A1* | 6/2002 | Carillo, Jr. | H01Q 1/245 343/702 |
| 2003/0101007 A1* | 5/2003 | Dubois | G01N 29/0645 702/39 |
| 2006/0169046 A1* | 8/2006 | Gordon | G01N 29/041 73/587 |
| 2009/0027229 A1* | 1/2009 | Fortson | H04Q 9/00 340/870.07 |
| 2009/0043516 A1* | 2/2009 | Liu | G01N 29/041 702/35 |
| 2010/0050308 A1* | 3/2010 | Roberson | F41H 5/0428 2/2.5 |
| 2011/0035167 A1 | 2/2011 | Qing et al. | |
| 2012/0235693 A1 | 9/2012 | Feng | |
| 2013/0000408 A1* | 1/2013 | Meitzler | G01N 29/11 73/602 |
| 2013/0030727 A1* | 1/2013 | Zalameda | G01N 29/045 702/56 |
| 2013/0043888 A1* | 2/2013 | Soar | F41H 1/02 324/655 |
| 2013/0213137 A1 | 8/2013 | Ostapenko | |

FOREIGN PATENT DOCUMENTS

| | | |
|---|---|---|
| WO | WO 2006/103400 A1 | 10/2006 |
| WO | WO 2011/134068 A1 | 11/2011 |

OTHER PUBLICATIONS

International Preliminary Report on Patentability for International Application No. PCT/IB2016/001881, dated Jun. 28, 2018.

* cited by examiner

ARMOR PLATE DAMAGE DETECTION SYSTEM

RELATED APPLICATIONS

This Application claims the benefit under 35 U.S.C. § 119(e) to U.S. Provisional Application Ser. No. 62/266,898, entitled "Armor Plate Damage Detection System," and filed on Dec. 14, 2015, which is herein incorporated by reference in its entirety.

FIELD

The disclosed embodiments are generally directed to armor protective plates which may be mounted on vehicles and used by military and police, and directed to systems and methods used to test the plates for damage. More particularly, embodiments are directed to wave technology being used with other electronic systems, to detect, record, and communicate damage detected in an armor plate.

DISCUSSION OF THE RELATED ART

Historically, armor was made of metal or wood and deformed to absorb the impact of a projectile. Damage to armor components, such as plates, either from a projectile, or from inadvertent impact, were visually detectable by the wearer or others. Visual indicators such as cracks, dents and other deformities could be used to indicate weakness in the armor.

Modern armor typically includes several materials that work in combination. Ceramic armor worn by a soldier typically has a layer of ceramic armor plates to shred the projectile, followed by a layer of ultra-high molecular weight plastic, often with fiber reinforcement, which stops the remaining projectile fragments. The armor plates may have a soil backing material that provides comfort to the soldier and room for back-face deformation of the armor plate as the armor plates absorb the projectile energy. The entire armor plate assembly may be encased in a fabric, fiberglass, plastic or other type of protective material to prevent scuffing, minimize edge damage, and provide a uniform look to the final product.

Ceramic is a delicate substance. If a soldier accidentally drops their armor, the ceramic plate may crack, and the armor may become less effective in the area of the crack. The level of damage may not be visually detectable to the wearer as the internal ceramic plate may be covered by multiple layers of material. Therefore, the soldier may unknowingly wear an armor plate that does not provide adequate or expected levels of protection.

One accepted method of plate testing uses an X-ray machine to visually scan the internal features of the plate. This method of inspection is adequate for home-land inspection purposes. However, the process requires specialized equipment and staff and is not accessible at the front lines of a battle-zone.

X-Ray inspection methods also lack the immediacy that is sometimes required at the front-lines of a battle situation where a soldier may have only a few moments to select an armor plate and gear-up for deployment.

X-Ray inspection may also miss changes to the overall plate system as a whole. For example if different layers of the plate have delaminated from each other or have absorbed water or other chemicals, they may be weaker than expected, yet will show no physical damage, such as cracking, when X-Ray inspected.

SUMMARY

Disclosed herein is an armor plate damage detection system which includes a combination of multiple components. In some embodiments, one component in the system comprises a single transducer element that communicates with a memory element. The memory element may store results from a previous test scan of the plate when the plate is known not to be damaged and serve as a reference reading, for example, after manufacture or quality control check. In another embodiment, a component in the system has a microprocessor system that communicates with the components of the system. In another embodiment, the system has a display component that can be attached to the armor plate or mounted to the armor plate, or can exist as a separate circuit, to allow the user to activate a test scan through a test circuit, for example, by pushing a button or switch and read the results.

According to one embodiment, the test circuit itself has a wireless transmitter to allow remote monitoring of the armor plate. In other embodiments, the user may be a person wearing the armor plate or some other person or entity who is able to remotely control the system via various wireless communications.

According to one embodiment, the transducer element may include a single active area, such as a piezo-electric disc, which is capable of creating mechanical energy and receiving mechanical energy. In an embodiment, the transducer can be constructed from a separate transmitter and receiver module that are co-packaged or installed on the same armor plate. In another embodiment, piezo-electric discs are made with multiple regions or coated on both sides in order to emphasize or modify performance while still aligning to the concept that a mechanical wave will be generated in the plate at one location and received at one location.

According to one embodiment, an armor plate testing system comprises a transducer configured to apply a mechanical signal to an armor plate at a first location, the transducer being configured to receive a reflected mechanical signal resulting from the mechanical signal, and to covert the received mechanical signal to an electrical signal.

According to another embodiment, an armor plate testing system that includes means to: apply a mechanical signal into the plate at one location; receive a mechanical signal at one location; convert the received mechanical signal into a received electrical signal; store a representation of the received electrical signal as a known-good value; compare a received electrical signal at a future date to the original known-good value; and display the results of the comparison to a user. A mechanical signal may be applied, received and converted to an electrical signal by use of a single piezo-electric sensor. The mechanical signal may have a pulse length that is less than or equal to 2D/VN where D is the distance from the sensor to the nearest signal reflection feature, V is the velocity of the mechanical wave in the material being tested and N is the number of wavelengths required for the injection transducer to settle. A diameter of the piezoelectric sensor may be less than or equal to LV, where L is the chosen excitation pulse length and V is the velocity of the mechanical wave in the material being tested. A representation of the received electrical signal may be an value representing an undamaged or known-good value, and may be stored permanently with the armor plate in a non-volatile memory. The results may be displayed using two light-emitting indicators, one indicator for a failure and one indicator for a pass. The results may be displayed through a wired or wireless link to a remote display that may be part of a computer, network, tablet, smart-phone, or the Internet. The armor test may be activated by a push-button, switch, or other suitable actuator by the user of the plate or another person. A test may be activated remotely through a wired or wireless connection. A test may be self-activated by a timer. A test may be self-activated in response to external stimuli such as an accelerometer that detects that the plate has been dropped or struck. The display may provide a representative scale of armor plate health.

DETAILED DESCRIPTION

Figure 1A:
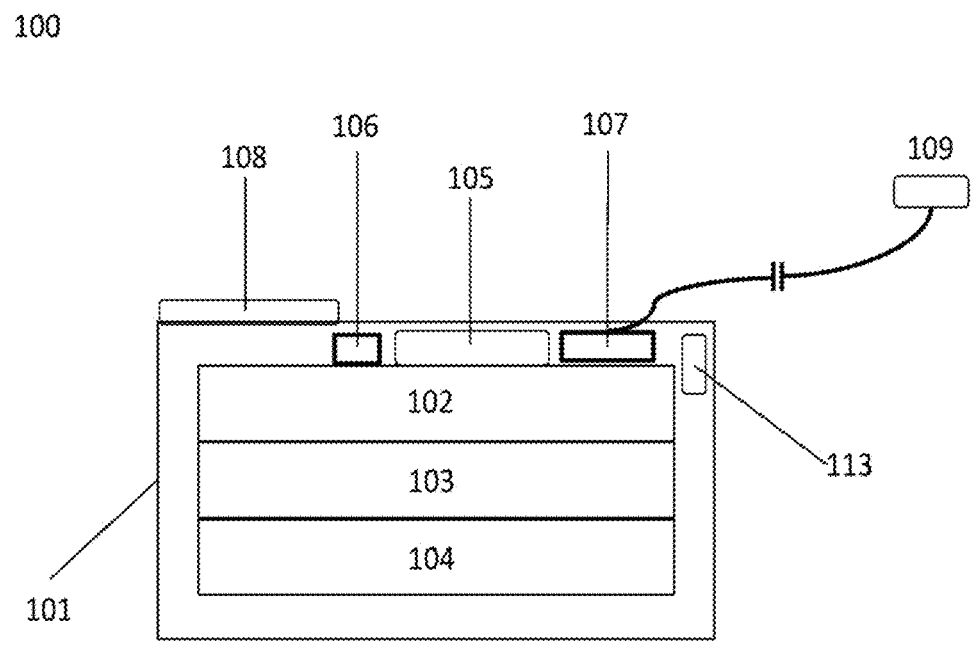
FIG. 1a shows a cross-sectional view of a composite armor plate, according to an embodiment.

Prior art systems and methods have been used to inspect armor, but may not be able to detect a broad range of damage types. For example, U.S. Pat. No. 7,180,302, (Kelsey), discloses embedding a single conductive path on a ceramic component of a plate. A large crack would sever the conductive path, changing the conductive path from a closed circuit capable of conducting electricity to an open circuit that is incapable of conducting electricity.

The system presented by Kelsey may not detect small or minor cracks as the ceramic plate can crack underneath the conductive material without fully severing the conductive path. Furthermore, larger cracks that sever the conductive material may not cause a permanent break. As the ceramic plate is flexed, the exposed ends of the conductive material may periodically touch each other (much like brushing the ends of two pieces of severed wire together) and this contact may complete the circuit. The plate may therefore give a "good" indication when the plate is damaged.

The system presented by Kelsey lacks the ability to test other layers of the armor plate system, cannot detect delamination of materials, and cannot detect changes in the materials, such as those caused by chemical exposure, that would weaken the ceramic.

Unlike the X-ray method of plate testing, the Kelsey system cannot inspect the magnitude of damage; the plate has test result of either "good" or "bad". With X-ray testing, one can ascertain the number and size of cracks in the plate.

The Kelsey system can only detect damage that crosses and separates a conductor. Kelsey teaches a generally S-shaped conductive path, such that if one of the illustrated cracks does not touch any of the conductive traces, the crack would be ignored.

WO2011/134068A1 (Soar) teaches a method of armor plate damage detection similar to Kelsey, except the conductive path in the plate is energized through an inductively coupled power source.

U.S. Pat. No. 8,333,140 (Meizler) discloses a self-diagnostic armor structure that is designed for military vehicle protection. Meizler teaches a method of placing light-conductive materials inside the armor plate and then arranging light emitters and detectors around the peripheral edges of the plate. In this way, the emitters may be turned on in specific ways and the light captured by the various detectors will indicate if damage has occurred to the optically transparent materials inside the plate, and therefore will show if there is damage to the plate substrate itself. Although the Meizler system can detect armor plate damage throughout the volume of the plate, the system requires many sensors, can only be performed on light-conductive materials, and cannot function on opaque armor or armor that contains multiple different layers of material. The large number of sensors and wiring required also adds weight, size, and complexity.

U.S. Pat. No. 8,752,432 (Meizler 2) teaches an alternate approach to self-diagnostic armor systems by modifying the construction of the armor itself into a multiplicity of ceramic tiles, each with a ceramic transducer attached. The ceramic transducer shape matches the polygonal shape of each tile. The transducers are designed to send vibrational signals that are parallel to the surface of the armor. Signals emitted by one transducer are picked up by all the other transducers in the system and the waveform of the signal can, with significant processing, be used to detect plate damage. The system of Meizler 2 is able to detect small amounts of damage, delamination, and changes in material. However, the system requires many sensors, and the number of sensors required is very high if many tiles are used to construct the plate. Generating a vibrational wave that is parallel to the surface of the plate requires specialized custom transducer construction, which may not be suited to high volume production. The system of Meizler 2 also requires a high number of tests including testing at multiple frequencies, recording at multiple frequencies, and a high number of permutations and combinations of transmitters and receivers in order to fully test the plate and sensor functions.

U.S. Patent Application Publication No. 2009/0043516 (Liu) uses a network of transducers all mounted on a common plate. Like the Meizler 2 system, Liu relies on one transducer to create a vibration in the plate that is received by the other transducers. Unlike Meizler 2, Liu determines damage to the plate by analyzing only the attenuation of the signal between the transmitting transducer and the receiving transducer. This approach may only detect damage along the path between each set of transducers.

U.S. Patent Application Publication No. 2012/0235693A1 (Feng) teaches a method of armor plate inspection by mixing conductive or semi-conductive materials into the plate structure. This system is similar to Meizler, but Feng uses electrically conductive materials and electrical sensors, whereas Meizler uses optically conductive materials and optical sensors. In both cases, a large number of sensors are placed around the periphery of the material and a variety of signals are applied to test for damage. The system of Feng may fail in situations where the cracks in the armor are so small that electrical conductivity is maintained, despite the presence of a crack. The system of Liu also may require mixing foreign materials into the armor plate, which may weaken the plate, and may not detect damage to other material layers in a composite system.

U.S. Patent Application Publication No. 2013/0213137 (Ostapenko), teaches a system to detect cracks and delamination in composite materials, which could include armor, by measuring the resonant frequency of the material. The resonant frequency is determined by vibrating the material using a large number of frequencies. Although this method may be able to determine changes in the material structure due to cracks and delamination, the test setup requirements, cost of broadband transmitters and sensors, the use of regular shapes which have well defined resonant frequencies, and calibration requirements limit its application for armor plates that are composed of many different materials.

There remains a need for a system that can detect different types of damage to an armor plate including cracking, delamination and chemical decomposition. There also remains a need for a user or a remote entity to be able to read damage results in real time without relying on manual recordings. There further remains a need for a damage detection system that can be self-contained so that no external computers, X-ray systems or signal injectors are required, as these will typically not be available on the battlefield. There further remains a need for such a system to be simple in form, and/or lightweight, and/or low cost. The embodiments disclosed herein are not limited to the battlefield, wherein there may be other scenarios and environments where the system would find utility, for example in a civilian environment where protection might be required against other forms of warfare.

FIG. 1a illustrates a cross section of a composite armor plate 100 according to some embodiments. The composite armor plate has three layers. The first layer of the plate may have a layer of ceramic material or other material 102, which functions to break up an incoming projectile when the projectile comes into contact with the ceramic layer. In an embodiment, the second layer may include a ultra-high molecular weight fiber reinforced plastic or other material 103, which functions to shield the first layer from the broken-up projectile fragments. The broken up projectile fragments may deform the plastic layer as a result of the force on contact. In an embodiment, the third layer may be a comfort layer 104, composed of foam, rubber or other material. The comfort layer 104 functions to absorb deformation that may occur in the plastic layer 103, and provides a cushion to the body to reduce trauma. In an embodiment, the ceramic, plastic and comfort layers and/or composite armor are encased in an outer layer 101 such as fabric, plastic, carbon fiber, fiberglass or some other suitable material. In an embodiment, the armor plate is uniform in appearance such that a user is unable to visually inspect the composite armor to look for damage that may have been caused by abuse, accident, dropping, chemical exposure, age, humidity or other causes.

In an embodiment, FIG. 1a shows an armor plate system 100 having a transducer unit 105, a memory unit 106, and a microprocessor unit 107. In an embodiment, the armor plate system has a display unit 108 that allows a user to view the results of a test scan of the armor plate system. In an embodiment, the plate system has a button or switch 109 that can be pressed to activate the test circuit. In an embodiment, the armor plate system has a wireless transmitter unit 113 that can communicate with a remote person or entity. In one embodiment, the results of a test scan are communicated with a remote person or entity.

Figure 1B:
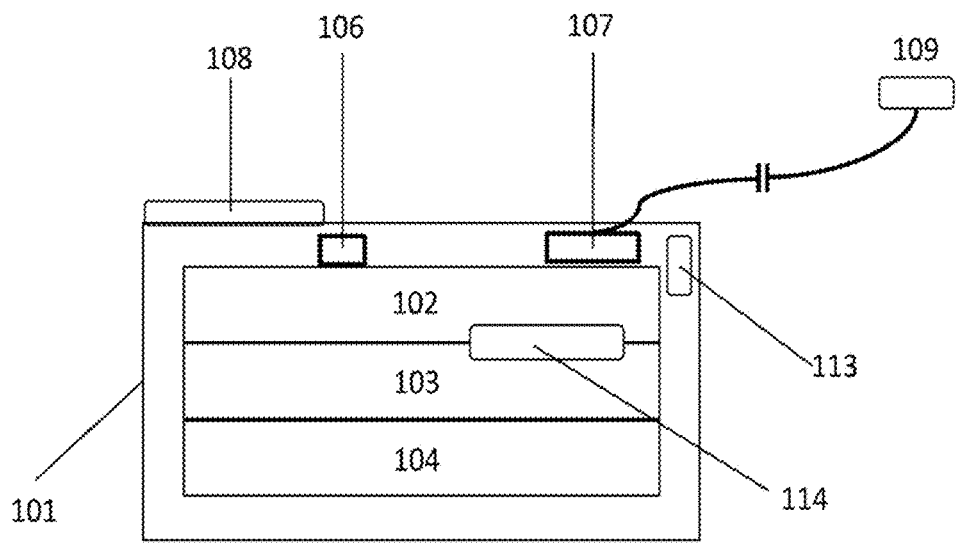
FIG. 1b illustrates a cross-sectional view of a composite armor plate, according to another embodiment, where a transducer element is located between ceramic and plastic layers.

The composite armor 100 can be configured in a wide variety of ways, and FIGS. 1a and 1b are used strictly for illustrative purposes. In some embodiments, the plates can be made with more or less layers. In other embodiments, the order of the layers and the composition of the layers can be changed while still retaining the features of a composite armor plate system.

In an embodiment, FIG. 1a illustrates that the system has a single transducer or single sensor unit 105 that is attached to the layer of ceramic material 102 on the outside surface (between ceramic 102 and covering 101). In one embodiment, FIG. 1b shows that the transducer component can be located on the inside surface, between the ceramic 102 and plastic 103 layers, as this further protects the sensor. In some embodiments, the mounting location of the sensor unit on or around the plate or other layers may be changed because of the flexibility of the system. In an embodiment, FIG. 2 illustrates that one factor in determining the location of the sensor may be an important factor in deciding the location of the sensor is the distance 204 from the sensor 202 to the nearest plate edge, as this is the shortest distance for any waveform produced by the sensor to travel.

Figure 2:
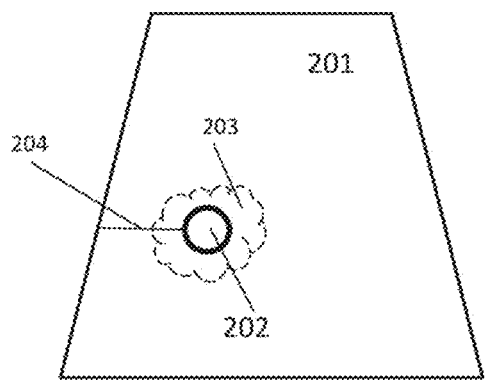
FIG. 2 shows a cross-sectional view of the front face of an armor plate, with a transducer or sensor unit located inside the armor plate, according to an embodiment of the invention.

In an embodiment, FIG. 2 shows a localized cross-sectional area of an armor plate system 200, which is denoted by the cloud-like area 203, to illustrate that the sensor unit 202 can be inside the armor plate 201.

In one embodiment, FIG. 2 shows a front facing perspective of a fully assembled armor plate 200 that can be worn by a soldier, for example on the chest. In other embodiments, the armor plate 200 can be tailored to any body size or shape. For example, the armor plate 201 can be modified in shape and size to fit a variety of body parts and shapes, such as complex curves, thinner areas and attachment points, as dictated by a preferred application or environment, the desired protection level and the user wearing the plate. In another embodiment, the armor systems disclosed herein are not limited to the type of body (human or otherwise) or limited to fit only a single person. In some embodiments, the armor system may be usable with vehicles or other mechanical equipment.

Figure 3:
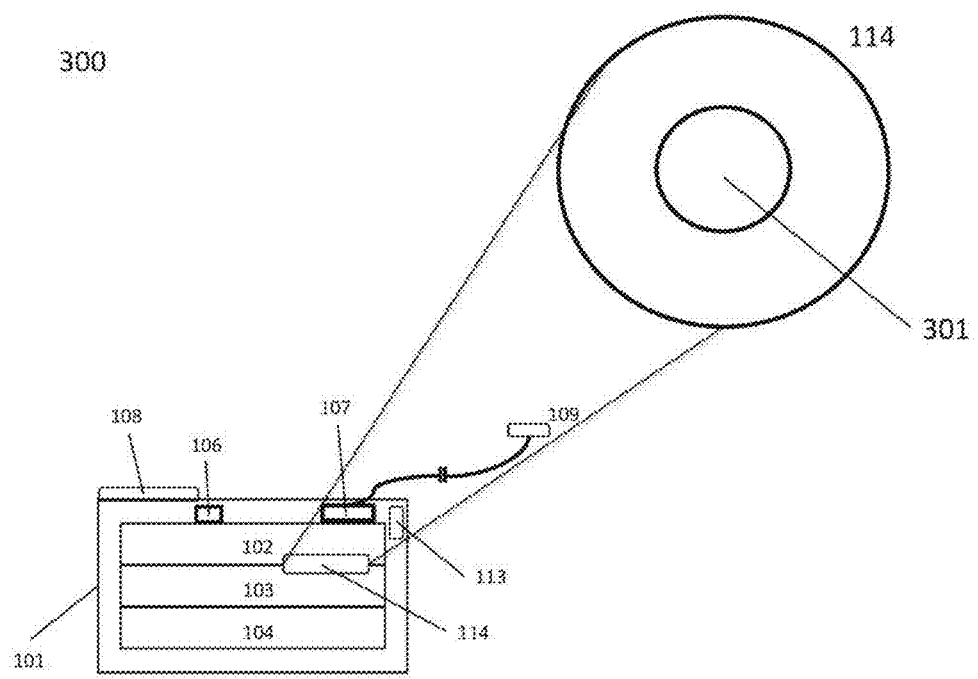
FIG. 3 illustrates a cross-sectional view of a composite armor plate, with a transducer element having a single active area, such as a piezoelectric disk, according to an embodiment of the invention.

In an embodiment, FIG. 3 shows that the sensor unit 114 may comprise a piezoelectric disk 301. Piezoelectric disks can be durable, light, thin, temperature stable, inexpensive and readily available, although other suitable sensors may be used. In an embodiment, the sensor unit 114 sends a transverse wave into the ceramic material or other suitable material, wherein the sensor unit 114 flexes perpendicular to the surface of the ceramic material, which causes a wave to radiate out from the sensor unit 114 in all directions.

Figure 4:
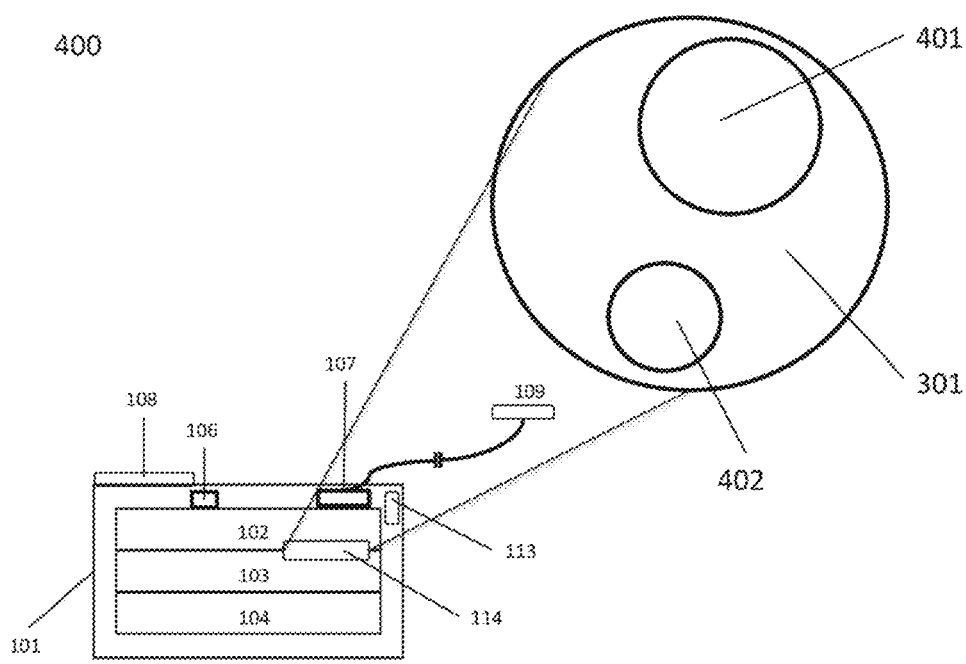
FIG. 4 illustrates a cross-sectional view of a composite armor plate, with a transducer element having a separate transmitter and receiver, according to an embodiment of the invention.

Piezoelectric disks may create electricity when they are flexed. In an embodiment shown in the magnified view of FIG. 4, sensor unit 114 may comprise a piezoelectric disk 301, where the sensor unit 114 is a transducer that is configured to transmit signals via a transmitter component 401 and receive signals via a receiver component 402. The sensor unit 114 produces mechanical energy by physically flexing in response to electricity, and produces electricity when flexed.

Other sensors may be used which produce a surface wave through compression of the ceramic surface. These sensors are typically composed of hundreds of layers of piezoelectric materials and are typically directional in nature, transmitting and receiving energy more strongly in certain directions. In other embodiments, other sensor types can be used, such as magnetic coils, painted-on electro-active coatings, microelectromechanical devices, or any other sensor that can both generate and respond to mechanical energy.

In one embodiment, a single sensor 202,114 is used to both transmit and receive mechanical energy from within the plate, where the injected waveform from the sensor is short enough so that it does not interfere with the received waveform.

The speed at which a mechanical waveform travels in the armor plate is dependent on the materials present. In air, a mechanical waveform (e.g., sound) travels at about 340 m/s (meters per second). The speed of a mechanical waveform in ceramics commonly used in military armor is about 6000 m/s.

In an embodiment, FIG. 2 represents an example, where the distance D 204 is the closest distance, in meters, from the sensor 202 to the edge of the plate. Given the speed of a waveform in the material is V, then the shortest time T for a wave to leave the sensor and return would be:

$$T=2D/V$$

In one embodiment a distance D equal to is 0.1 m and the velocity V equal to 6000 m/s, would result in wave leaving the sensor and returning in a time T equal to 33 μS.

It is known in the art that when a piezoelectric disk is excited, it flexes, but when the signal is taken away, it may continue to vibrate for a short time at its natural resonant frequency—sometimes referred to as self-excitation or ringing of the sensor. Ringing can be damped using mechanical and electrical means. Overdamping the sensor will limit ringing, but may lead to loss of sensitivity. A properly damped sensor may require an additional time of three to five wavelengths of the excitation pulse for the sensor to settle before receiving the returned pulse.

Given the desirability for N wavelengths for ringing to settle, we find the excitation pulse length L may be shorter than:

$$L=2D/VN$$

In one embodiment, there is a distance of 0.1 m to the plate edge, a velocity of 6000 m/s and three wavelengths of settling time. This results in an excitation pulse length of 11 μs.

In other embodiments, shorter excitation pulses, or repeated excitation pulses can be used at frequencies much higher than the example shown above. As the frequency increases, there may be more signal loss as the returned waveform may become averaged out by the sensor itself.

The diameter of the sensor 202, 114 may produce the maximum signal when the mechanical waveform length matches the diameter of the sensor. At this point, the mechanical flex of the sensor may be minimized along the edges of and maximized in the center of the sensor (or vice versa as the wave passes). A selected diameter of the sensor therefore may depend on the excitation pulse chosen in combination with the material properties.

In the following equation, d is the sensor diameter, L is the chosen excitation pulse length in seconds and V is the velocity of the wave.

$$d=LV$$

In an embodiment, a wave of 11 μs in a material with a mechanical waveform speed of 6000 m/s, the calculated sensor diameter would be 11 μs×6000 m/s, or 6.6 cm. As noted above, the length of the pulse can be made shorter than the calculations show. In an embodiment, for example, if L is 5 μs and V is 6000 m/s, then d will be 3 cm. A 3 cm sensor may still provide a desirable sensitivity, cost and performance.

A possible limiting factor in choosing smaller sensors is related to the frequency of operation. As a sensor gets smaller, the frequency at which it is operated is typically increased. Higher frequencies are generally absorbed by surrounding materials, so the sensitivity may be compromised if the sensor is too small.

With the calculations provided above and bearing in mind the material properties to be measured, an appropriate size sensor and excitation frequency can be chosen for the system.

Figure 5A:
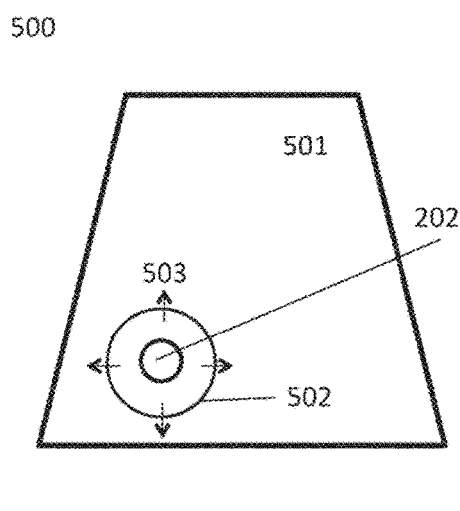
FIG. 5a shows the movement of a transverse wave through undamaged material at an initial point in time, according to an embodiment of the invention.
Figure 5B:
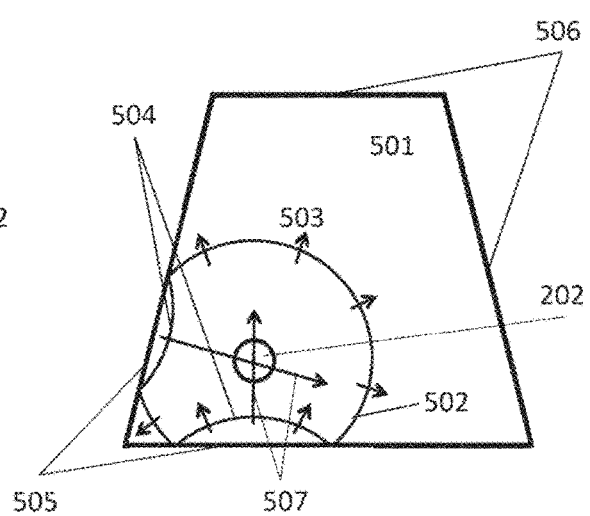
FIG. 5b shows the movement of a transverse wave through a material, at a subsequent point in time relative to the point of time in FIG. 5a, where the wave is reflecting off edges of the material and moving back toward a sensor unit, according to an embodiment of the invention.

In an embodiment, FIGS. 5a and 5b show an armor plate damage detection system 500 where the sensor unit 202 has been activated and where its action is depicted at two subsequent points in time (FIG. 5a and FIG. 5b). FIG. 5a illustrates that after injecting the mechanical pulse of energy into the armor plate material 501, an initial wave is generated 502 from the sensor unit 202, 114 that radiates away 503 from the sensor 202. FIG. 5b illustrates that at a subsequent point in time, the initial radiating waves 502 are reflected 504 by the edges of the plate 505, 506 and by any other features associated with the mechanical and material properties of the plate. The plate edges 505 closest to the sensor 202 reflect the wave energy first, followed by the other edges 506. In addition, it is well known in the art that energy reflected from one edge can intersect and reflect from another edge (not shown in the figures). As this mechanical energy travels, it crosses 507 and re-crosses (not shown) the sensor unit 202 at further subsequent points in time. The wave and other energies eventually dissipate due to the materials and repeated reflections at the edges.

In an embodiment, when a plate 501 is first manufactured and known to be undamaged, the waveform produced by a known injection pulse 502, 504 can be recorded, for example in the memory component. The representation of the received electrical signal may be stored as a known-good value in a non-volatile memory, and the non-volatile memory may be attached, in some cases permanently, to the armor plate system. The recording of this injection pulse when the plate is undamaged can serve as a baseline that can be used in a processing method in the microprocessor 107 to analyze to future recordings. In an embodiment, at a future point in time, a subsequent injection pulse can be produced and the reflected waveform analyzed with reference to the baseline stored in the memory element.

In an embodiment, the method of creating and storing a baseline waveform improves manufacturing of the system as slight changes in the sensor, the mounting location, processing and plate sizes can be calibrated out of the system.

Figure 6A:
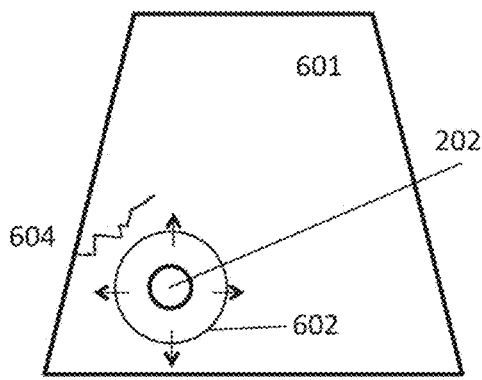
FIG. 6a shows the movement of a transverse wave through a damaged material, at an initial point in time, according to an embodiment of the invention.
Figure 6B:
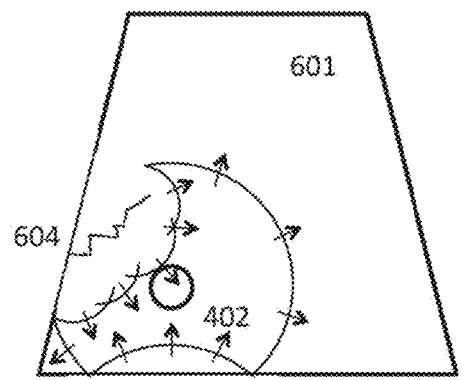
FIG. 6b shows the movement of a transverse wave through a damaged material, at a subsequent point in time to that in FIG. 6a, where the wave is reflecting off edges of the material and a damaged portion of the material, and where the reflected waves are moving back towards the transducer, according to an embodiment of the invention.

In an embodiment, FIGS. 6a and 6b show two subsequent points in time 600 during a test signal, where a damaged armor plate 601 has a physical defect or crack 604. At a first point in time (FIG. 6a), the sensor unit is activated, generating a waveform 602 that begins to travel away from the sensor unit 202, much like in FIG. 5a. However before the waveform reaches a particular edge of the material, its path is interrupted by the edges of the damaged portion of the material. In FIG. 6b, when the wave reaches the damaged portion of the plate 604, it reflects off the edges of the damaged material and travels back towards the sensor 202. Unlike in FIG. 5b where the waveform is not interrupted prior to reaching the edges of the material, in FIG. 6b, the reflected waves are returning from the edges of the cracks in the plate and not the edges of the plate. The returning or reflected waveform in FIG. 6b results in a particular waveform being received by the sensor and will be different to that received by the sensor in FIG. 5b.

In other embodiments, the particular waveform may vary and change based on the type and extent of the damage in the armor plate system so that the recorded test signal is a representation of the type and extent of the damage in the armor plate system. In an embodiment, the armor plate is delaminated or is chemically or biologically compromised, resulting in an alteration of the physical integrity of the armor materials, which generates a particular waveform in the signal received by the sensor 202, 114. For example, if the ceramic material has absorbed a chemical from the environment that softens the ceramic material, the velocity of the waveform and the propagation losses may increase. As a result, the test would detect significant shifts in both the timing and amplitude response of the returned waveform. In a similar fashion, delamination of the structure creates irregular reflections between the material layers as the waveform propagates in a three-dimensional fashion through all materials of the plate. It is expected that the soft comfort layer, for example, would absorb the test pulse energy. But if it is delaminated in a region of the plate, that region will not absorb the energy and will result in higher than expected localized reflections. In a more particular embodiment, any other change in the armor plate system that can generate an altered waveform can be recorded by a test signal.

In an embodiment, the difference between the signature waveform and the subsequent tested waveform can be detected, and if the result is outside of the normal variation for that armor plate, as determined through test and analysis of similar systems, the plate would be considered to have failed the test. In particular embodiments, a failure result can be based on a number of statistical analysis functions that can be, but are not limited to one or more, but at least one of the following: simple as point-for-point comparison of the waveform, total energy analysis, wave shape detection, difference detection (through subtraction of the waveforms), Fourier analysis, binning, averaging, and time-slicing.

In an embodiment, the magnitude of the difference between the expected signals or signature waveform and the test signal is a factor when analyzing the results or data received from the sensors. In particular embodiments, extensive or significant damage to the plate results in drastic changes to a waveform, while minor damage causes more minor changes to the waveform relative to a significant damage.

In an embodiment, the magnitude of the change or relative difference in waveform can be presented on a normalized scale, such as a display 108, percentage indicator, or an LED indicator with multiple indicator lights. In an embodiment, the results that are processed and communicated on a display give the user a more accurate and reliable indication of the extent and nature of the damage to the plate due to the quantifiable measure and analysis of the test signal. In an embodiment, other analysis methods can be integrated into the test system configured to generate specific information about the state of the armor plate.

In a preferred embodiment, a plate system that produces a result of no significant change in the returned waveform can be interpreted as 100% healthy. In an embodiment, an interpretation is communicated on a 5-LED indicator, where for example all 5 LEDs can be lit when the user initiates a plate test that is 100% healthy. In another embodiment, a plate system digitally communicates an interpreted message with a remote monitor. For example, a message such as "100%" or another preferred message, can be sent to the monitoring system to indicate the plate is undamaged.

In a further embodiment, if the plate has relatively minor damage as measured by minor changes in the returned waveform, an indication of 80% healthy might be produced, similarly only 4 LEDs might be lit on a health indication display to reflect this relative level of damage.

In a further embodiment, if the plate has major damage, the indicator may drop to 20% or even 0%. In an embodiment, the LED scale and relative damage calculated can be calibrated based on the level of acceptable damage for a particular environment.

In an embodiment, a user, when faced with a variety of plates to choose from for a mission, can choose the plate with the highest state of health. If all of the plates in inventory show some level of damage, embodiments of the system disclosed herein may provide the soldier with the ability to select the least damaged plate for their mission.

Figure 7A:
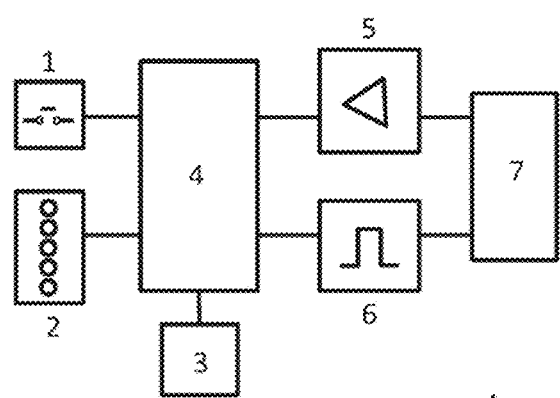
FIG. 7a illustrates circuitry of an armor plate system that connects elements, units and components of the system, according to an embodiment of the invention.

In a preferred embodiment, FIG. 7a illustrates that a circuit for generating the injected pulse 1, receiving the reflected energy 4, 5, storing the resulting sensor waveform 3, comparing the waveform and displaying the result, can all be embedded within the armor plate such that the system becomes a completely self-contained unit. This allows the plate to be tested at any time and location. The user could test the plate by simply pushing a button and observe the indicator to be assured that the armor plate is still good.

In an alternate embodiment, the sensor would be applied to the plate in a consistent location using a test system designed for the purpose. For example, a forward operating base or remote military installation could include a test system that has a cradle-jig sized for each plate type in use. The appropriate cradle would be selected for the plate to be tested, and the plate would then be inserted in the cradle. In this case the cradle may contain the transducer and would apply and receive the mechanical pulse to the plate, removing all active components and circuitry from the armor plate. Since the plates being tested would have a known transducer location, pressure and plate size, it may be possible to use a single representative waveform signature for each plate size, without the need for a fully-custom signature that represents every single plate that is manufactured. This would allow armor plates manufactured without integrated testing to be tested using similar methods.

In an embodiment, this system can have a sensor, memory element, and a known "good" waveform representation for the plate being tested. In a particular embodiment, the system can be integrated into the soldier load carriage system (such as a fabric pouch normally used for carrying the armor plate). In another embodiment, the system could reside in a separate package that the plate is loaded into for testing prior to a mission. One skilled in the art can implement an external system that uses the systems disclosed herein comprising fundamental damage detection concepts and calculations for the injected waveform magnitude and frequency, sensor size, and waveform comparison.

Figure 7B:
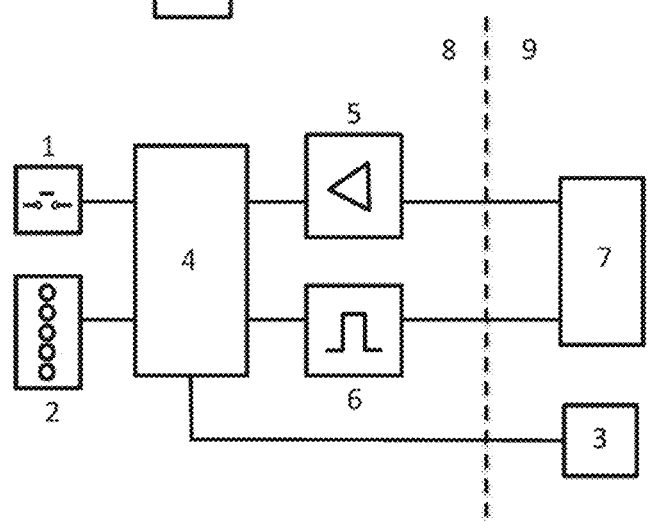
FIG. 7b illustrates an external circuit system for an armor plate system where the transducer and memory element remain on the armor plate, and the remaining components may be configured to complete the circuit from a location other than the armor plate, according to an embodiment of the invention.

In an alternate embodiment, FIG. 7b illustrates a limited amount of circuitry 9 that resides on the armor plate system. This limited circuitry would include a sensor 7 and a memory chip 3 for storing a representation of the known good waveform. The circuitry used to interface to the sensor and to read from the memory chip, would be applied by the user when testing the plate. Such an external tester could be in the form of a hand-held tester, a computer, or a larger multi-channel test system. This embodiment would be a preferred embodiment for soldiers who are already carrying a computer system, such as a hand-held smartphone, tablet or other device capable of generating an electrical pulse, receiving an electrical pulse, performing statistical calculations, and displaying a result to the user.

In an alternate embodiment, part of the circuitry can be on the plate and the remainder of the circuitry can reside external to the plate. In an embodiment, the splitting or partitioning of the circuitry and the determination of which part of the circuitry resides on the plate and which part of circuitry resides off the plate, would be determined based on the application of the particular plate and user needs.

In an alternate embodiment, the armor test signal is generated in response to a command that is received by the system from a remote location. For example, a centralized command system may wirelessly broadcast a request to the solder-carried equipment requesting that an armor test be conducted. In an embodiment, the circuitry would automatically test the armor and either return the final result to the centralized command system, or it may return only the representative waveforms, allowing the centralized command system to perform the necessary comparison and statistical analysis to determine if the armor was damaged. Such armor test signal may also be generated by the soldier's commander, by a forward operating base, at a pre-determined time (ongoing status reporting), in response to external stimuli such as an accelerometer detecting that the plate was dropped or struck, or by any other connected system, either wired or wireless.

Figure 8:
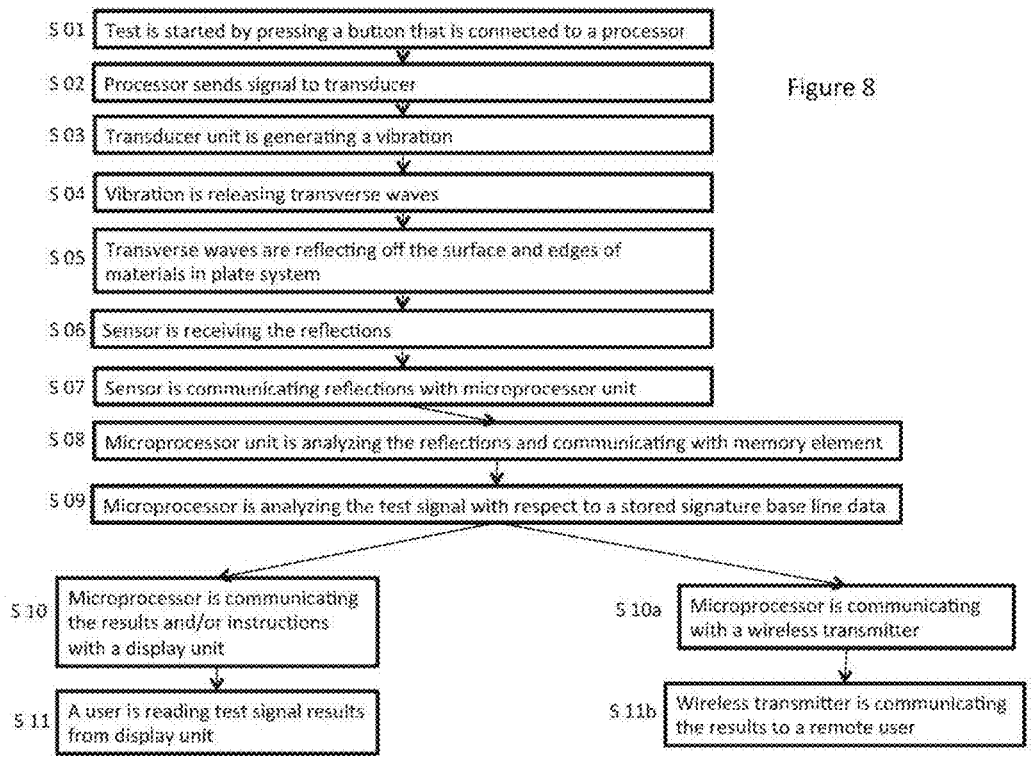
FIG. 8 is a process flow diagram of methods of an armor plate system, according to an embodiment of the invention.

In an embodiment, FIG. 8 illustrates the steps involved in the overall operation of a plate system. In step 1 (S 01), the user starts a test by, for example, pressing a button that can be connected to a microprocessor. In step 2 (S 02), the microprocessor activates the transducer unit S (03) to generate a vibration. In step 4 (S 04), the vibrating transducer unit releases transverse waves. In step 5 (S 05), the transverse waves travel across the plate system, reflecting off the surface and edges of the plate materials. In step 6 (S 06), a sensor in the plate system receives the reflections. In step 7 (S 07), the sensor communicates the reflections with a microprocessor unit. In step 8 (S 08), the microprocessor unit analyzes the received reflections or test signal and communicates with the memory element. In step 9 S (09), the microprocessor unit analyzes the test signal with respect to the stored signature base line data. In step 10 (S 10), the microprocessor communicates the results of the analysis to a display unit. In step 11 (S 11), a user is reading the results of the analysis from the display unit. In step 10a (S 10a), the microprocessor unit communicates with a wireless transmitter. In step 11b (S 11b) the wireless transmitter communicates the results with a remote user or entity. In an embodiment, the remote user is able to wirelessly send instructions or messages to the plate system that can be read by a user who can read or is wearing the armor plate system.

Although the description above contains much specificity, these should not be construed as limiting the scope of the invention but as merely providing illustrations of embodiments of the invention. Thus the scope of the invention should be determined by the appended claims and their legal equivalents.

What is claimed is:

1. An armor plate testing system comprising:
    an armor plate;
    a transducer adapted to apply a mechanical signal to the armor plate at a first location, the transducer being adapted to receive, at the first location, a reflected mechanical signal resulting from the mechanical signal, and to covert the received mechanical signal to an electrical signal, wherein the transducer is mounted on or around the armor plate, and the tranducer is the only mechanical signal transducer operationally mounted on or around the armor plate.

2. An armor plate testing system as in claim 1, wherein the transducer comprises a piezoelectric sensor.

3. An armor plate testing system as in claim 2, wherein the diameter of the piezoelectric sensor is less than or equal to L·V where L is a chosen excitation pulse length and V is a velocity of the mechanical wave in the material being tested.

4. An armor plate testing system as in claim 1, further comprising:
    a memory configured to store a representation of the electrical signal as a first value.

5. An armor plate testing system as in claim 4, wherein the memory is a non-volatile memory and the representation of the electrical signal is stored as a known-good value in the non-volatile memory, and the non-volatile memory is attached to the armor plate.

6. An armor plate testing system as in claim 1, wherein the system comprises a microprocessor configured to compare the electrical signal to a previously determined known-good value of the electrical signal.

7. An armor plate testing system as in claim 6, further comprising a display configured to display a result the comparison of the electrical signal to a previously determined known-good value of the electrical signal.

8. An armor plate testing system as in claim 7, wherein the display comprises first and second light-emitting indicators, the first indicator to indicate a fail and the second indicator to indicate a pass.

9. An armor plate testing system as in claim 7, wherein the display is located remotely from the armor plate, the display being linked by wire or wirelessly to the microprocessor.

10. An armor plate testing system as in claim 1, further comprising an user-activated button or switch to apply the mechanical signal to the armor plate.

11. An armor plate testing system as in claim 1, further comprising a user actuator that is remote from the armor plate, wherein the user actuator communicates with the microprocessor either wirelessly or through a wired connection.

12. An armor plate testing system as in claim 1, further comprising a timer configured to automatically apply the mechanical signal to the armor plate.

13. An armor plate testing system as in claim 1, further comprising a detector to detect forces on the armor plate, and wherein the testing system is configured to self-activate in response to a detection of forces.

14. An armor plate testing system as in claim 1, wherein the mechanical signal is a mechanical waveform.

15. An armor plate testing system as in claim 1, wherein the transducer is mounted on the armor plate.

16. An armor plate testing system as in claim 1, wherein the transducer is located between a ceramic layer and a plastic layer.

17. An armor plate testing system as in claim 1, wherein the transducer is located between a ceramic layer and a cover.

* * * * *